United States Patent
Zöllner et al.

(10) Patent No.: US 7,790,089 B2
(45) Date of Patent: Sep. 7, 2010

(54) PROCESS AND MOLD FOR MOLDING AND COATING A SUBSTRATE

(75) Inventors: Olaf Zöllner, Leverkusen (DE); Thorsten Just, Randersacker (DE); Jörg Tillack, Berg.-Gladbach (DE); Bernd Hausstätter, Leverkusen (DE); Michael Glawe, Solingen (DE); Klaus Konejung, Bergisch Gladbach (DE); Steffen Lang, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 793 days.

(21) Appl. No.: 11/312,885

(22) Filed: Dec. 20, 2005

(65) Prior Publication Data

US 2006/0151911 A1 Jul. 13, 2006

(30) Foreign Application Priority Data

Dec. 24, 2004 (DE) .................. 10 2004 062 510
Dec. 24, 2004 (DE) .................. 10 2004 062 511

(51) Int. Cl.
*B29C 45/14* (2006.01)
*B29C 45/16* (2006.01)

(52) U.S. Cl. .................... 264/328.7; 264/260
(58) Field of Classification Search ............ 264/260, 264/328.7
See application file for complete search history.

(56) References Cited

U.S. PATENT DOCUMENTS 4,584,325 A * 4/1986 Smith ............ 521/99
4,668,460 A 5/1987 Ongena ............ 264/255
4,929,724 A 5/1990 Engbert et al.
5,174,933 A * 12/1992 Toh et al. ............ 264/40.5
5,773,049 A * 6/1998 Kashiwa et al. ............ 425/572
6,019,921 A 2/2000 Lutz ............ 264/129
6,180,043 B1 1/2001 Yonemochi ............ 264/255
6,361,732 B1 3/2002 Schumacher ............ 264/275
6,544,449 B1 4/2003 Gardner
6,558,599 B1 5/2003 Bethune
2003/0197307 A1 10/2003 Kitamura et al. ............ 264/255
2005/0003100 A1 1/2005 Gram ............ 427/553

FOREIGN PATENT DOCUMENTS

DE 196 50 854 C1 3/1998
EP 0271051 A2 6/1988

OTHER PUBLICATIONS

Patent Abstracts of Japan Bd. 017, Nr. 041 (M-1359), Jan. 26, 1993 & JP 04 259517 A (Sekisui Chem Co Ltd), Sep. 16, 1992.

* cited by examiner

*Primary Examiner*—Philip C Tucker
*Assistant Examiner*—Alison Hindenlang
(74) *Attorney, Agent, or Firm*—Connolly Bove Lodge & Hutz LLP

(57) ABSTRACT

A process for in-mold coating and a mold is disclosed. The process entails (i) obtaining a mold having at least two cavities, (ii) molding a thermoplastic substrate in a first cavity, (iii) introducing the substrate into a second cavity, and (iv) coating said substrate with lacquer, the coating being carried out under enhanced pressure.

15 Claims, 1 Drawing Sheet

PROCESS AND MOLD FOR MOLDING AND COATING A SUBSTRATE

FIELD OF THE INVENTION

The invention relates to a process for thermoplastic molding and more particularly to in-mold coating and a mold.

BACKGROUND OF THE INVENTION

EP 197 496 A discloses a process for molding and coating an article (herein a substrate) in the mold. The molding of the substrate is carried out between two separable sections of the mold with a mold cavity lying in between, until the substrate has at least partly cured. When the substrate has cured to the extent that its surface has formed a skin which is receptive to the coating, the coating is injected into the mold cavity. The coating is injected in under a pressure which is considerably above the pressure which prevailed in the mold cavity immediately before the injection. During the injection, the sections of the mold are kept in a closed position under pressure without substantial withdrawal of the sections. The coating is thereby substantially forced over the entire surface of the substrate and compressed. According to EP 197 496 A, molding of the substrate is carried out by means of injection compression molding. Various disadvantages, e.g. lengthening of the cycle time, which are associated with opening and closing of the mold before injection of the coating were said to be avoided with the process according to EP 197 496 A. According to EP 197 496 A, by injecting the coating under a pressure which is greater than the curing pressure, the opening and closing can be by-passed. Disadvantages of the process described in EP 197 496 A arise from the fact that substrate production and substrate coating take place sequentially in one cavity. Various process parameters for the two process steps, such as e.g. wall thickness of the coating or mold surface temperature are therefore restricted.

DE 43 16 154 A describes a process for coating an interior finishing component with a crosslinkable curing resin or lacquer. In this process, the interior finishing component is laid in a defined position into a mold, in order for a coating to be applied to the surface of the interior finishing component in the manner of an injection molding or pressure diecasting operation. The resin or the lacquer is applied in the required total thickness in the closed mold in a single working step. During the entire curing time, a pressure which remains constant with respect to time is exerted on the resin or lacquer, which is initially liquid and then sets in the mold, in spite of a shrinkage due to the setting. In this context, the pressure is chosen such that any air present is dissolved in the liquid resin or lacquer. In the process according to DE 43 16 154 A, a ready-made interior finishing component is laid into the mold for the coating operation. The interior finishing component is accordingly produced independently of its coating. During coating, the internal pressure in the mold is maintained, in spite of the shrinkage, by driving in the ram of the mold. The high internal pressure in the mold is said to have the effect that air remains dissolved during the curing and thus does not adversely influence the quality of the coating. The external production of the interior finishing component to be coated by injection is a disadvantage, since this in particular increases the expenditure on apparatus for the process. The production costs are therefore considerably higher.

EP 934 808 A discloses a process for in mold coating, which comprises, in a first step, the production of a shaped article in the mold from a synthetic resin by an injection molding process, an injection compression molding process or an injection press-molding process. This is effected by applying a clamping pressure to a mold, which includes a fixed mold half and a movable mold half. In a second step, the clamping pressure is reduced or the fixed and movable mold sections are moved apart, before a coating material is injected into the mold between an inner surface of the mold and a surface of the shaped article in a further step. Clamping of the mold after the injection of the coating material is carried out under certain clamping pressures which can be varied in multiple stages, with certain clamping pressure transition periods. The two steps of the process according to EP 934 808 A, the molding of the shaped article and the coating of the shaped article, are carried out in one cavity, curing of the coating taking place under a specific pressure profile. Since in this process also the individual steps are carried out in one cavity, the same disadvantages as for the process according to EP 197 496 A apply.

US 2003/0197307 A discloses a process for injection molding of a molding and subsequent coating with a thermosetting lacquer layer. The injection molding and subsequent coating take place in two separate mold cavities. According to US 2003/0197307 A, a thermosetting composition which substantially comprises no readily volatile components is employed for the coating.

The object of the present invention is to provide a process for molding a substrate and coating with a lacquer, which does not have the abovementioned disadvantages of the prior art. The lacquer coating in particular may be applied uniformly and in a faultless quality, independently of its thickness.

SUMMARY OF THE INVENTION

Figure 1:
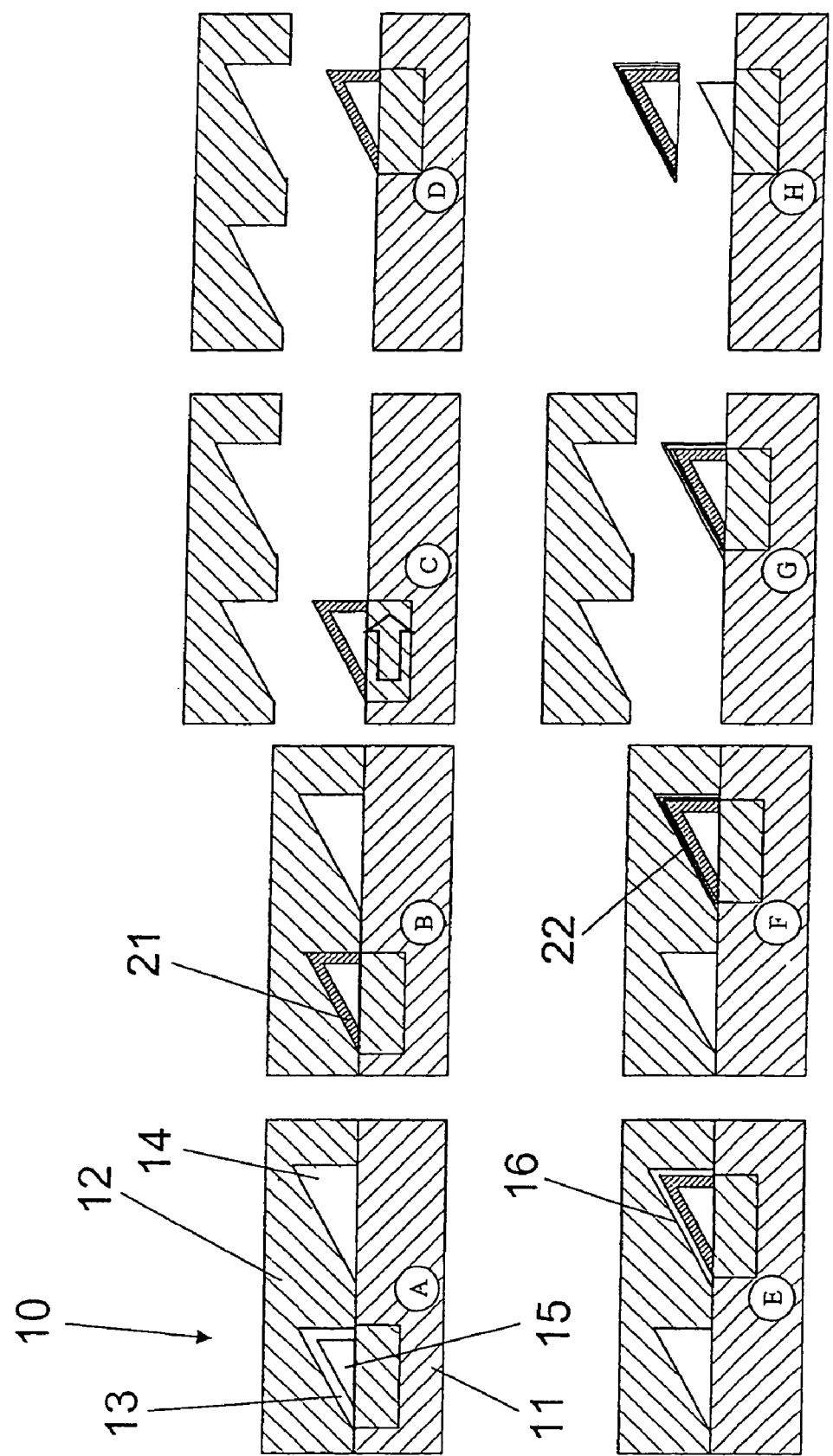
FIG. 1 is a schematic representation of an embodiment of the inventive process.

A process for in-mold coating is disclosed. The process entails (i) obtaining a mold having at least two cavities, (ii) molding a thermoplastic substrate in a first cavity, (iii) introducing the substrate into a second cavity, and (iv) coating said substrate with lacquer, the coating being carried out under enhanced pressure.

DETAILED DESCRIPTION OF THE INVENTION

The invention provides a process for in-mold coating of a substrate in a mold having at least two cavities, comprising the following steps:

(a) molding a substrate in a first cavity of the mold (b) introduction the substrate into a second cavity of the mold (c) coating of the substrate in the second cavity with lacquer, the coating being carried out under pressure, i.e. under enhanced pressure, and curing the lacquer.

The process according to the invention is carried out in a mold which has two or more cavities, so that the two process steps of (a) molding and (c) coating of the substrate take place in different cavities. The surfaces of the cavities may be produced from the same or different materials, such as e.g. glass, ceramic, plastic, metals or alloys.

The molding of the substrate in a first cavity according to step (a) may be carried out, for example, by injection molding, injection compression molding, compression molding, reaction injection molding (RIM) or foaming. All the thermoplastic and thermosetting plastics may be employed as materials, e.g. polycarbonate (PC), polyester, particularly polybutyleneterephthalate (PBT) or polyethyleneterephthalate (PET), polyamide (PA), polyethylene (PE), polypropylene (PP), polystyrene (PS), poly(acrylonitrile-co-butadiene-co-styrene) (ABS), poly(acrylonitrile-co-styrene-co-acrylicester) (ASA), poly(styrene-acrylonitrile) (SAN), polyoximethylene (POM), cyclic polyolefine (COC), polyphenylenoxide (PPO), polymethylmethacrylat (PMMA), polyphenylensulfide (PPS), polyurethane (PUR), epoxyresin (EP), polyvinylchloride (PVC) and blends thereof. The substrate may be of any desired shape.

Preferably, the molding of the substrate according to step (a) is carried out by the injection molding process from a thermoplastic. The injection molding process is known. If the substrate is produced by injection molding from a thermoplastic, all the thermoplastic plastics are suitable, e.g. PC, PBT, PA, PE, PP, PS, ABS, ASA, SAN, PET, POM, COC, PPO/PA or PPO/PS blends, PMMA, PPS thermoplastic polyurethane (TPU), EP, PVC and blends thereof.

After molding of the substrate, the substrate is introduced, according to step (b), into a second cavity of the same mold. For this, the mold is opened and the substrate is transferred into a second cavity. The transfer of the substrate may be carried out by known methods, such as are used, for example, in multicolored injection molding. Typical methods include transfer with a rotary table, turning plate, sliding cavity and index plate as well as comparable methods in which the substrate remains on the core. If the substrate remains on the core for the transfer, this has the advantage that the position is also accurately defined after the transfer. On the other hand, methods for transfer of a substrate in which the substrate is removed from one cavity, e.g. with the aid of a handling system, and laid into another cavity are known from the prior art. Transfer with removal of the substrate offers a greater design tolerance in the coating, e.g. in the generation of a bend or masked regions.

According to step (c) of the process according to the invention, the substrate is coated with a lacquer in a second cavity of the mold, the coating being carried out under pressure. This means that both the application and the curing of the lacquer are carried out under pressure. An adequate pressure is necessary both in the injection and in the holding pressure phase, i.e. during curing, of the lacquer, in order to avoid bubble formation in the lacquer layer. The lacquer layer is applied by introducing, e.g. injecting, the lacquer under pressure into the gap between the surface of the substrate and the inner wall of the cavity. The pressure must be high enough for the cavity to be filled before the end of the pot life of the lacquer is reached. At the same time, the pressure prevents the formation of bubbles at the flow front of the lacquer. Curing of the lacquer is also carried out under pressure. In the context of the present invention, during curing of the lacquer means the time which is at least necessary to ensure reliable removal of the coated substrate from the mold without damage to the lacquer layer. This pressure must be high enough for bubble formation in the lacquer during curing to be suppressed. The pressure furthermore ensures that the volume shrinkage of the lacquer during curing is compensated. At the end of the curing time, the pressure in the cavity may have fallen to ambient pressure.

The pressure during the coating is preferably 10 to 90 bar, particularly preferably 40 to 60 bar. This externally applied pressure may be kept constant during the coating, i.e. during the injection and curing. Alternatively, the externally applied pressure may also be varied during the coating, the pressure preferably being in the range of from 10 to 90 bar, particularly preferably 40 to 60 bar. The pressure may be applied externally e.g. by a ram. Alternatively, the pressure may be applied by a compression operation.

The process according to the invention is suitable for layer thicknesses of the lacquer in the range of from 0.01 to 3 mm.

In a preferred embodiment, the thermal expansion of the substrate and of the lacquer—e.g. achieved by heating of the upper part of the mold—is utilized to adjust the pressure in the cavity during coating. By the choice of the mold surface temperatures and/or the dwell times in the first and/or the second cavity, a mold internal pressure profile may be generated in a controlled manner according to the lacquer formulation. The temperature of the first cavity is chosen appropriately for the substrate material to be processed. It is preferably 40 to 80° C. The dwell time in the first cavity is preferably 30 to 60 seconds. In the second cavity, the lacquer can be injected on to the substrate under a temperature in the range of from 20 to 120° C. appropriate for the materials selected, and cured. The dwell time in the second cavity is preferably at least 45 seconds, particularly preferably 45 seconds to 2 minutes. Since the dwell time depends on the lacquer formulation, the dwell time may also be longer, e.g. up to 10 minutes.

While shrinkage occurs in the first cavity due to cooling of the substrate, thermal expansion of the substrate and of the lacquer takes place in the second cavity due to the elevated temperature. The thermal expansion may be adjusted in a controlled manner such that it achieves the desired internal pressure in the second cavity. In the second cavity, that mold half to which the lacquer layer is adjacent is preferably heated up. The elevated temperature in the second cavity thus not only promotes curing, but also allows the internal pressure in the mold to be influenced in a controlled manner due to the thermal expansion of the lacquer layer and substrate.

It is moreover possible to adjust the temperature of the mold surfaces to different values in various regions of the cavities. This may be utilized in a controlled manner, for example, to generate local mold internal pressure profiles.

In a preferred embodiment of the process during step c) the pressure in the second cavity or in a part of the second cavity is kept constant or is kept above a threshhold pressure of 10 bar (10.000 hPa) by heating the substrate and the lacquer during coating and curing of the lacquer.

This embodiment, according to which the internal pressure in the cavity is effected via thermal expansion of the substrate and of the lacquer, is of advantage over a process in which the internal pressure is adjusted via the externally applied pressure for the following reasons: Firstly, the pressure may be applied uniformly over the entire molding, without lacquer having to be forced into the cavity during the curing phase. Secondly, the volume shrinkage of the lacquer may be compensated locally by curing. Finally, the pressure during curing may be varied by controlled locally different temperature control of the mold.

The coating of the substrate according to step c) is carried out in particular by injecting the lacquer into the cavity via one or more nozzles such that the gap between the surface of the substrate and mold inner wall is filled completely with lacquer. For an optimum injection of the lacquer, the number and position of the injection points are chosen appropriately in a manner known to the person skilled in the art. One criterion for the design of the second cavity is controlled displacement of the air present in the cavity and its removal via the parting line or venting channels during the injection. Known calculation programs may be used for this. The sprue design for injection of the lacquer may be e.g. according to the sprue variants known from the prior art for the production of RIM moldings.

In a preferred process, the coating according to step (c) is carried out by the RIM process with a single cavity such as is known from the prior art. This has the advantage that the two components of the two-component lacquer system are combined only directly before injection into the cavity.

Compared with other processes, the RIM process is said to offer the possibility of mixing the components directly, before introduction into the cavity. As a result, the process becomes independent of the pot life of the system. It has been possible to demonstrate the advantage clearly in experiments. Further advantages are the substantially reduced expenditure on cleaning and the increased process reliability, since malfunctions in the area of the injection molding machine cause no secondary damage in the metering and mixing of the lacquer components.

Furthermore, after an interruption in production, the system may continue immediately with production of moldings lacquered in a high quality.

The cavity for coating the substrate may be of any desired design, so that the lacquer layer e.g. is the same thickness over the entire surface of the substrate. However, the cavity may also be shaped such that the lacquer layer is of different thickness in various regions of the substrate. The desired lacquer layer thickness may be achieved at any point of the substrate in this manner.

All low-solvent one-component or two-component systems, which cure either via free radicals, ionically or via polyaddition, suitable for the lacquering of the plastic may be employed for the coating of the substrate according to step (c). Lacquer systems considered low in solvent are those having a solvent content of, in particular, not more than 10 wt.%, preferably not more than 2 wt.%, particularly preferably not more than 1 wt.% of the lacquer content. Solvent-free systems are particularly preferably employed. In particular, solvent-free polyurethane lacquer systems or polyureas systems are employed, solvent-free aliphatic polyurethane lacquer systems being particularly preferably used.

If two-component lacquer systems are employed, these components may be mixed thoroughly either in the lacquer injection nozzle, e.g. by a high pressure counter-current mixing head, or in the feed line by a static mixer or active mixing with the aid of a dynamic mixer, depending on the pot life and installation technology. If the pot life is long, mixing of the two components may also be carried out outside the installation and the mixture is processed like a one-component system. In this case, for example, the processing time may be prolonged by cooling the components before injection, and a short reaction time may be achieved by increasing the mold temperature in the second cavity.

Lacquer systems having a short pot life are conventionally employed. Preferably, systems having a pot life of not more than 30 min, particularly preferably having a pot life of not more than 10 min, very particularly preferably having a pot life of not more than 2 min are chosen. For short pot lives, a high pressure counter-current mixing head is preferably employed for mixing the two components. Compared with other processes, this allows the highest productivity. Furthermore, no residues of mixed lacquer raw material remain in the mold at the end of the process.

Before the molding of the substrate according to step (a) and the coating according to step (c), a release agent may optionally be applied, e.g. sprayed on, to the surface of the cavities in an additional process step. Suitable release agents are known.

The process according to the invention may also be carried out in a mold having more than two cavities. Thus e.g. further lacquer layers with optionally specific properties may be applied by applying each lacquer layer in its own cavity. It is furthermore possible to produce several substrates in parallel in one cavity each in a process step according to step (a) and then to coat these with lacquer according to step (c) successively in one cavity or in parallel in one cavity each.

The process according to the invention offers several advantages compared with the prior art. The cycle time is shorter, since it is not composed of the sum of the times of the individual process steps. In addition, process parameters, such as e.g. the mold wall temperature, may be chosen independently of one another for process steps (a) and (c) and therefore be optimally matched to the substrate material and lacquer. As a result, inter alia, the cycle time may also be optimized. Moreover, the thickness of the lacquer layer may be freely chosen at any point of the cavity. Furthermore, different materials, such as e.g. glass, ceramic, plastic, various metals or alloys, may be chosen for the surfaces of the various cavities.

Release agents, if necessary, may also be employed on the mold surfaces in a controlled manner. Thus e.g. a good separation of the lacquer from the mold surface may be achieved, without the adhesion of the lacquer to the substrate being adversely influenced.

A further subject matter of the invention is a mold for carrying out the process according to the invention accordingly comprising at least two cavities, at least one cavity being connected to an injection molding device and one cavity being connected to a RIM lacquer injection device.

The injection molding device of the mold according to the invention serves for the production of the substrate from a thermoplastic by means of injection molding in a first cavity of the mold. Suitable injection molding devices are known to the person skilled in the art. They include a standard injection molding machine construction comprising a plasticating unit for processing of the substrate and a closing unit, which is responsible for the travelling, opening and closing movement of the mold, temperature control apparatuses and optionally drying apparatuses for the substrate.

The lacquer injection device, which is connected to a second cavity in the mold according to the invention, serves for coating of the substrate with a lacquer according to step (c). Suitable lacquer injection devices are known to the person skilled in the art. They include one or more reservoir containers for the individual components, stirrers, feed pumps, temperature control devices for establishing the temperature, feed lines and optionally a mixing device for mixing more than one lacquer component, e.g. a mixing head for high pressure counter-jet mixing.

The lacquer-coated substrates produced by the process according to the invention are suitable, for example, as automobile interior components, such as e.g. pillar lining, trim, glove compartment covers, coverings, light shades, instrument panels, components of the air delivery system, and industrially produced components of plastic, such as e.g. housings of electrical equipment, mobile telephones and household articles.

The invention is explained in more detail below in reference to FIG. 1. FIG. 1 shows the essential features of the process referencing features (A)-(H). It shows the injection mold, 10, with two mold sections 11 and 12, a substrate cavity, 13 and a lacquer cavity 14. At the start (A) the mold, 10, is closed and the core, 15, is in the substrate cavity, 13. The thermoplastic for molding the substrate 21 is injected in and solidifies (B). When the temperature suitable for removal of the solidified substrate from the mold is reached, the substrate, 21, is transferred from the substrate cavity, 13, into the lacquer cavity 14 (C) and (D). For this, the mold 10 is opened as shown in (C), and in the embodiment shown substrate, 21, is pushed together with the core, 15, into the lacquer cavity, 14, (corresponding to the marking by the arrow in (C). When the substrate molding 21 is in the lacquer position (step D), the mold 10 is closed (E). The lacquer cavity 14, i.e. the gap in the mold between the substrate molding, 21, and mold wall, 16, is filled with lacquer, 22, via nozzles (not shown). The lacquer, 22, is kept under pressure through curing (F). When the lacquer has reacted completely and cooled, the mold, 10, is opened (G) and the substrate, 21, coated with lacquer, 22, is removed from the mold (H).

EXAMPLES

Embodiment Example

A molding coated with lacquer and having a projected area of 40 cm$^2$ was produced on an injection molding machine in an injection mold having two cavities (one substrate cavity and one lacquer cavity, which was linked to an RIM installation). The substrate was a box-shaped structural component having angled side faces. The wall thickness of the substrate molding was approx. 3 mm. The surfaces of the substrate were provided with various lacquer thicknesses in a series of experiments. The layer thickness of the lacquer was adjusted in the ranges of from approx. 300 to 1,000 µm, depending on the area.

The substrate was produced in the first step. For this, the granules of plastic were melted in an injection molding cylinder. They were a PC+ABS blend (Bayblend® T65 from Bayer MaterialScience AG), which, after the melting operation—analogously to the standard injection molding process—was injected into the first mold cavity of the closed mold at a temperature of 270° C. After the holding pressure time and cooling time of 45 s had elapsed, the mold was opened. During this, the substrate produced was held on the ejector side of the injection mold and moved complete with the mold core, into the lacquer position by a slide. The lacquer cavity was treated beforehand with a release agent (ACMOS 36-4566 from Acmos, Germany). Thereafter, the injection mold was closed again, a closing pressure of not more than 200 bar was built up and a solvent-free aliphatic polyurethane lacquer comprising a solvent-free polyester polyol (available as Desmophen® VPLS 2249-1 from Bayer MaterialScience AG) and a solvent-free aliphatic polyisocyanate (available as Desmodur® XP 2410 from Bayer MaterialScience AG) at a weight ratio therebetween of 1:1, catalysed with approx. 1% DBTL, was injected into the lacquer cavity under pressure of 50 bar. The two lacquer components were fed from the RIM installation into a high pressure counter-current mixing head and mixed there before the injection. After the end of the injection, the lacquer injection nozzle was sealed by means of a hydraulic cylinder under pressure of initially 50 bar, in order to prevent backflowing of the lacquer. Due to the higher average temperature in the cavity compared with the average temperature for removal of the thermoplastic molding from the mold, the pressure in cavity rose during curing to the extent that the impression of the mold surface was very good and bubble formation in the lacquer was avoided. After the reaction and cooling time of 45 seconds had elapsed, the mold was opened and the lacquered molding was removed from the mold. In the context of the experiments, the lacquer injection temperature and the mold surface temperature of the lacquer cavity on the lacquer side were varied. The temporal course of pressure shown in the following table resulted here.

| Time after injection | Temperature of the lacquer cavity | | |
|---|---|---|---|
| of the lacquer | 80° C. | 100° C. | 120° C. |
| 0 s | 50 bar | 50 bar | 50 bar |
| 10 s | 70 bar | 95 bar | 150 bar |
| 20 s | 80 bar | 115 bar | 170 bar |
| 30 s | 70 bar | 110 bar | 180 bar |
| 40 s | 50 bar | 100 bar | 175 bar |

As may be seen from the pressure courses, at the end of the curing time a drop in pressure occurred, which was to be attributed to the volume shrinkage of the lacquer during curing.

The lacquer showed a good adhesion to the substrate. It was possible to remove the lacquered molding from the mold without problems. The lacquer surface was a mirror image of the high-gloss polished mold surface.

Comparison Example

A comparison experiment was carried out on a sample sheet mold. The mold here was assembled on an injection molding machine and connected to an RIM installation. The mold had a sheet-shaped cavity, which was filled with plastic by the standard injection molding process. After the cooling time had elapsed, the lacquer was introduced into the still closed mold cavity. This was effected via an RIM installation, which mixed the two lacquer components in a hose system by means of a static mixer and introduced the mixture into the mold. After the lacquer system had reacted and cooled, the mold was opened and the coated sheet was removed from the mold. Here also, the substrate was Bayblend® T65 and the lacquer was Desmophen® VPLS 2249-1 Desmodur® XP 2410 at a 1:1 weight ratio, catalysed with approx. 0.2 % DBTL, analogously to the example described above, but due to the low catalyst concentration, with a considerably longer pot life adjusted to approx. 20 min. It was not possible to realize shorter pot lives in this case because of the course chosen for the process and the mixing of the components in the feed line.

The following disadvantages were associated with this course of the experiment. Since the mold remained closed until the lacquer was introduced, i.e. was not opened between production of the substrate and coating of the substrate, the cavity had to be wetted with release agent before the operation of injecting the plastic. During injection of the plastic, some release agent also settled on the surface of the plastic. As a result, the adhesion of the lacquer to the substrate deteriorated significantly. Furthermore, it was not possible to adjust the lacquer thickness in a defined manner. The thickness depended on the shrinkage of the substrate and the geometry of the molding. This led to an undesirably high lacquer thickness, especially at the freely shrinking edges of the molding.

Due to the process steps being carried out sequentially, the cycle time comprised the sum of the times for the individual processes. This in turn had an effect on the choice of lacquer, since the pot life of the lacquer system played a considerable role in this procedure. The choice of lacquer was therefore limited.

Moreover, it was not possible for the mold surface temperature to be freely chosen, so that it was not possible to achieve the desired internal pressure profile by thermal expansion and to utilize the associated advantages.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for in-mold coating comprising (i) obtaining a mold having at least two cavities, (ii) molding a thermoplastic substrate in a first cavity, (iii) introducing the substrate into a second cavity, (iv) coating said substrate with lacquer, the coating and subsequent curing of the lacquer being carried out under enhanced pressure, the pressure resulting from an injection pressure and a curing pressure, wherein the pressure during step (iv) is kept constant or is kept above a threshold pressure of 10 bar as the injection pressure decreases during curing, and the pressure in the cavity during step (iv) is adjusted and influenced in a controlled manner by thermal expansion of the substrate and of the lacquer.

2. Process according to claim 1, characterized in that the coating with lacquer according to step (iv) is carried out by the reaction injection molding (RIM) process.

3. The process according to claim 1 wherein the molding is by injection molding, injection compression molding, compression, foaming or reaction injection molding.

4. The process according to claim 1 wherein the lacquer cures via free radicals, ionically or via polyaddition.

5. The process according to claim 1 wherein the lacquer contains not more than 10 wt. % solvent, the percent being relative to the weight of the lacquer.

6. The process according to claim 1 wherein the lacquer contains not more than 2 wt. % solvent, the percent being relative to the weight of the lacquer.

7. The process according to claim 1 wherein the lacquer contains not more than 1 wt. % solvent, the percent being relative to the weight of the lacquer.

8. The process according to claim 1 wherein the lacquer is solvent free.

9. The process according to claim 1 wherein the lacquer is a one-component or two-component lacquer.

10. The process according to claim 1 wherein the lacquer is a polyurethane system or a polyurea system.

11. The process according to claim 1 wherein the lacquer is a solvent-free aliphatic polyurethane system.

12. The process according to claim 1 wherein the lacquer has a pot life of not more than 30 min.

13. The process according to claim 1 wherein the lacquer has a pot life of not more than 10 min.

14. The process according to claim 1 wherein the lacquer has a pot life of not more than 2 min.

15. The process according to claim 1 wherein the pressure during coating according to step (iv) is in the range of from 10 to 90 bar (10.000 to 90.000 hPa).

* * * * *